March 11, 1969     T. M. KERSKER ET AL     3,431,962

REINFORCEMENT FOR PNEUMATIC TIRES AND THE LIKE

Filed Aug. 22, 1966

INVENTOR.
THEODORE M. KERSKER
FREDERICK J. KOVAC

United States Patent Office 3,431,962
Patented Mar. 11, 1969

3,431,962
REINFORCEMENT FOR PNEUMATIC TIRES AND THE LIKE
Theodore M. Kersker and Frederick J. Kovac, Akron, Ohio, assignors to The Goodyear Tire & Rubber Company, Akron, Ohio, a corporation of Ohio
Filed Aug. 22, 1966, Ser. No. 574,220
U.S. Cl. 152—355          13 Claims
Int. Cl. B60c 9/06

ABSTRACT OF THE DISCLOSURE

A pneumatic tire or like elastomeric article, and a reinforcement element therefor, which comprise a strip of non-circular cross-section, e.g., rectangular, having a multiplicity of continuous parallel untwisted filaments adhesively bonded or compacted together in continuous untwisted parallel array, or ply fabrics including such strip reinforcement elements. The strip elements have cross-section peripheries significantly greater and gage thickness significantly smaller than conventional cord of equal strength.

---

The foregoing abstract is not to be taken as limiting the invention of this application, and in order to understand the full nature and extent of the technical disclosure of this application, reference must be made to the accompanying drawing and the following detailed description.

The present invention relates to reinforcement fabrics, fabric elements for rubber articles and particularly to a reinforcing strip element, a fabric incorporating such strip elements, and to the methods of manufacturing such fabrics. The invention has particular utility in the reinforcement of pneumatic tires.

Pneumatic tires, as well as other rubber structures requiring reinforcement, have utilized fabrics or cords in diverse combinations both of material and arrangement.

Certain disadvantages reside in the twisted structure of the yarns, cords, and fabrics used in the past. The maximum tensile strength of the single fiber is not developed, the elongation of the cord assembly is greater, as is its longitudinal growth, compared with that to be expected from the theoretical considerations of the unit fiber strength and with the results of practical tests of parallelly oriented fibers. The bulk, particularly in the gage, i.e., thickness dimension, required to meet the strength requirements subject the fabric and the rubber-fabric bonds to greater shear stress than ideally desired during flexure in normal service. The energy thereby converted to heat is an important source of the heat which can become destructive of tires.

In radial ply tires the mechanism by which the tire operates differs from that of bias ply tires and makes necessary a reduction in elongation and improved resistance to growth in the reinforcement material as compared with twisted cord reinforcement.

The present state of development of continuous artificial filaments of relatively great length and of adhesive systems compatible therewith have made practical a new approach to the problems of reinforcement of rubber articles, particularly pneumatic tires.

An important object of the invention is to provide reinforcement for pneumatic tires and reinforced rubber articles which develops the full tensile strength of the filament materials, which is useful of itself in reinforcing and useful as well as a fabric to form ply material adapted to tire building.

A further object of the invention is to provide reinforcing material of increased tensile strenth, and with stiffness effective to resist strains due to braking or acceleration in pneumatic tires, yet flexible to yield to road shock, and an improved tire incorporating such material.

Yet another objective of the invention is to provide a reinforcing material for pneumatic tires having increased resistance to the shear stresses within the fabric and within the fabric-rubber adhesive bond.

Other objects, features and advantages, both express and implied, will become apparent as the description proceeds and with reference to the attached drawing forming a part of this application in which.

Figure 1:
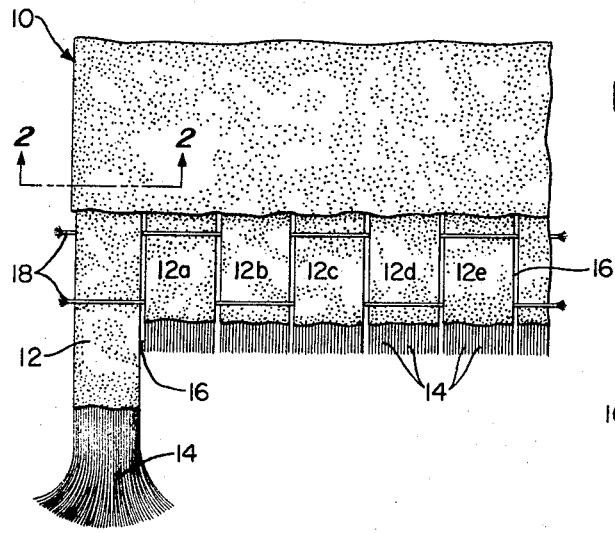
FIGURE 1 is a plan view of one form of the fabric of the instant invention showing also one form of the strip element of the instant invention.

In FIGURE 1 a ply 10 according to the instant invention includes a number of strip elements 12, 12A ... 12E, lying flat, parallel and side by side. Each strip element comprises from several hundred to several thousand single individual filaments, i.e., the multiplicity designated by the numeral 14, each being continuous or of great length and referred to as indefinite in length, and made of synthetic material such as rayon, nylon, polyester, fiberglass, and other suitable materials. They are particularly to be distinguished from staple natural or cut fibers and from yarn or threads made by twisting such fibers.

The individual filaments may be of any size but conveniently the sizes are within range of those currently being utilized in the production of twisted cord, that is, within the range of 1.0 to 4.0 denier for rayon, and 3.0 to 10.0 denier for nylon and polyester.

The individual filaments are not twisted, or are at least substantially untwisted. It is not necessary to provide specific means for removal of a slight twist inherent in the ordinary removal from a package or spool but twist in accordance with prior practice with yarn and cord is avoided.

The several hundred to several thousand fibers are drawn together, positioned to lie straight and parallel and are coated with an adhesive by dipping, or by any convenient method, to insure adherence of the filaments one to another. The adhesive coated fibers are compacted either by passing through the nip of a pair of rolls or through a die to form the desired cross-section and to insure the penetration of the adhesive throughout the bundle of filaments. The strip element so formed and cured or set as a coherent structure tends of itself to remain untwisted and is preferably used, or incorporated in fabric, ply, or tire in untwisted state.

The size and weight, and thus the cross-sectional area of the individual strip element, will be determined by the specific properties of the filaments chosen and by the strength requirements of the article to be reinforced. For example, strip elements having cross-sections of 0.20″ width and 0.02″ thickness constructed of the filament materials indicated, and bonded together by an adhesive of rubber and resorcinol-formaldehyde resin have the properties given in the table.

TABLE I

| Fiber | Rayon | Nylon | Polyester |
|---|---|---|---|
| Denier | 17,600 | 16,900 | 18,200 |
| Number of filaments | 16,500 | 2,820 | 2,910 |
| Percent impregnant by weight | 16.4 | 19.6 | 13.5 |
| Tensile strength (pounds) | 213 | 336 | 351 |
| Elongation at break, percent | 3 | 11 | 7 |

A feature of the instant invention is the use of a relatively large quantity of adhesive in contrast to known fiber-adhesive systems. Not only does this provide efficient adhesion of filament to filament and development of the maximum tensile strength of the multiplicity of filaments but also provides for close control of the shape of the cross-sectional area so as to provide a high degree of uniformity and cohesion. For example, the strip elements of Table I incorporate a percentage of impregnate or adhesive by weight of from 13.5 to 19.6. The range contemplated within the scope of this invention will lie between 9 and 10 percent and 40 percent of the total weight of the strip.

The objects and advantages of this invention are achieved by any cross-section gage dimension (i.e., thickness, as in the radial direction with respect to the tire, of the rubber article) which is less and preferably significantly less than the gage dimension of the circular cross-section of the heretofore employed twisted cord. Such circular cross-section is of course an inherent result of the twisting usually practiced.

Figure 2:
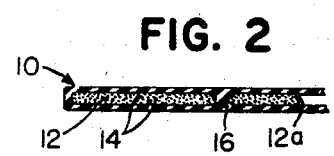
FIGURE 2 is a cross-sectional elevational view taken along the lines 2—2 of FIGURE 1 showing a cross-section of the fabric, of the ply, and of the strip element of FIGURE 1 according to the instant invention.

A number of cross-sectional shapes are contemplated. As seen in FIGURE 2 the multiplicity of filaments 14 of the strip elements 12 lie in generally rectangular cross-section the thickness or gage of which is advantageously from about ⅕ to ¹⁄₂₅ of its width. Elliptical, oval, rectangular, trapezoidal or other cross-sections with or without rounded corners each can provide some or all of the advantages of the instant invention. No such cross-section will practically be less in gage, or thickness, than several times, usually from ten to twenty times the denier or caliper of one filament. The following table presents the properties of strip elements of a polyester filament in generally rectangular cross-sections of several different gage-width ratios. In the samples tested, the filaments were bonded together by an impregnant, or adhesive, comprising rubber and resorcinol-formaldehyde resin.

A still further advantage of the instant invention results from flexibility in yielding to impact load or road shock favorably combined with useful stiffness with respect to stress applied in the general plane of the strip element or of the fabric. Such strains occur in tires particularly due to the acceleration and deceleration resulting from starts or stops. A resistance to flexure in directions normal to the plane of the strip element can be seen to be much less than the resistance to flexure in directions within the plane of the element. Previously used cords have essentially the same resistance to flexure in any direction due to the circular cross-section inherent in the twisting of yarn and cord. The combination of flexibility in the one direction and stiffness in the other is particularly advantageous in pneumatic tires, yielding improved performance.

For purposes of comparison and assuming that the cross-sectional area occupied by the fibers in the cord of the prior art will have generally the same strength characteristics as an equal area of filament in the strip elements of the instant invention, it will be instructive to compare the dimensions of such circular area with a rectangular area representative of the noncircular cross-sections of this invention.

The area of a circle equals $0.7854d^2$.

The area of a rectangle equals the width times thickness ($= wt$).

If $w=5t$, and if the area of such circle is to equal the area of the rectangle, then $$5t^2 = .7854d^2$$

and $$t = 0.4d \text{ (approximately)}$$

If $w=25t$, then $$25t^2 = 0.7854d^2$$

and $$t = 0.1d \text{ (approximately)}$$

Thus the gage or thickness dimension of such a representative strip element according to the instant invention is from about 10% to about 40% of the corresponding gage dimension of the twisted cord elements of the prior art, for at least equal reinforcement strength. In other words, a greater filament strength in equal gage dimension, or an equal strength in lesser gage dimension, results than provided by the generally circular cross-sections of the prior art reinforcing cord.

It has been determined that the development of heat in tires and like rubber articles is directly related to the gage dimension of the reinforcing material. Without being limited to the consequences of a particular theory, this is thought to be the effect of the energy absorbed in the reinforcement and reinforcement-rubber bonds due to the shear forces of constantly repeated flexure. With a lesser gage dimension the flexure produces smaller strains in the reinforcement and the energy expended in the flexure is thereby reduced.

The rectangular or other non-circular cross-section in accordance with this invention has a still further advantage in that it permits for each individual strip element a significant increase in periphery and in surface, compared to a round cord of equal strength, area for bonding of the strip element itself to the rubber in the tire or other article. The adhesive or impregnant is chosen for compatibility both with the filament material chosen and the particular rubber selected with the result that the adhesive system relating the strip element, the filaments thereof and the rubber in the article, due to the increased available surface area, are more securely bonded one to another than is the case in the tire with conventional twisted cord fabric reinforcement.

FIGURES 1 and 2 show also a ply 10 constructed of a plurality of parallel side by side strip elements 12, 12A ... 12E. Each strip element is separated from the next adjacent strip by a space 16 generally ranging from about ¹⁄₁₆ to about ¼″ and preferably about ⅛″.

TABLE II

| Tape dimensions | .020′ x .200′ | .020′ x .500′ | .040′ x .400′ | .060′ x .300′ |
|---|---|---|---|---|
| Denier | 18,200 | 45,000 | 72,800 | 81,900 |
| Number of filaments | 2,910 | 7,180 | 11,620 | 13,100 |
| Percent impregnant by weight | 13.5 | 13.9 | 13.4 | 13.5 |
| Tensile strength (pounds) | 351 | 865 | 1,413 | 1,572 |
| Elongation at break percent | 7 | 7 | 7 | 7 |
| Cross-section ratio | 1:10 | 1:25 | 1:10 | 1:5 |

The fabric comprising a plurality of tapes or strip elements, may if convenient have a woven therethrough weft or pick threads 18, which subsequently will be removed or broken as is customary in the art, prior to assembly into a tire, or may be passed through a calender and be coated on one or both sides with a suitable rubber compound. The spacing 16 mentioned will be chosen to permit the necessary movement of one element relative to another experienced in the course of building and shaping a tire.

Comparing the two types of reinforcement, the conventional twisted cord fabric and the strip element fabric of the instant invention, assuming that there are the same number of reinforcing filaments in a unit width of cord and in the strip element fabric, it is evident that because of the rounded structure of the cords there will be relatively larger spaces between the cords which have to be filled with rubber stock. On the other hand, in the spaces 16 between the strip elements in the fabric of the instant invention the volume and weight of the rubber compound required will be considerably less than that required for the conventional fabric. Thus, in the fabric ply of the instant invention the ratio by weight of filament reinforcement to rubber is generally about 4 to 1; in the cord ply heretofore used it must generally be about 3 to 2. Thus to surround and cover the heretofore used fabric cord ply requires about 40% rubber, or about 60% more than do the fabric strip elements of the instant invention. The reduction in rubber content of the reinforcement ply of the instant invention provides a further significant advantage in that the weight and cost of the tire reinforcing can be materially reduced.

The completed ply material 10 is cut into suitable ply stock in the usual manner, the direction of the strip elements 12 being determined by the tire designer to suit his requirements.

Figure 3:
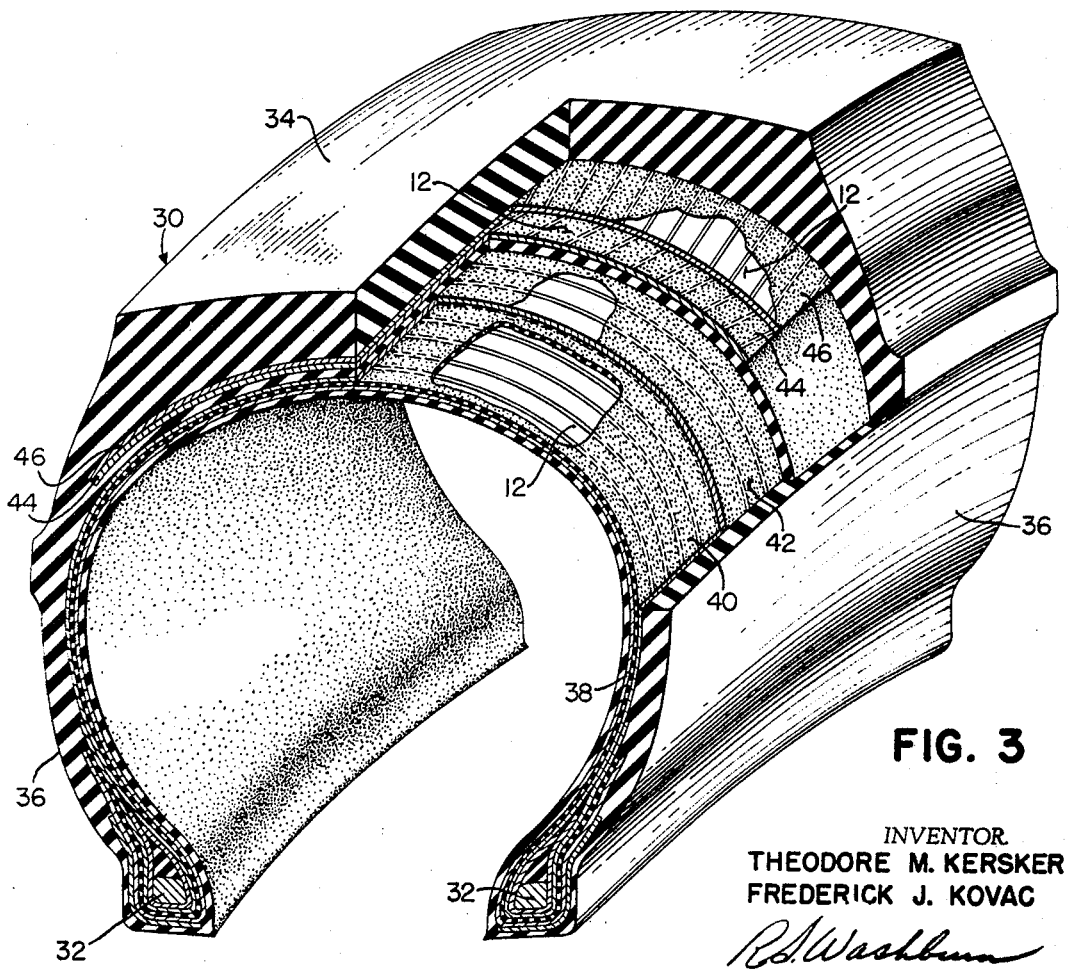
FIGURE 3 is a view, in perspective of a section of a tire employing forms of the invention in the reinforcement thereof, parts thereof being broken away.

FIGURE 3 shows in perspective a section of tire 30 constructed in accordance with the principles of this invention. The invention has particular utility in a radial ply tire such as shown, and which has beads 32, tread portion 34, sidewalls 36, and carcass 38.

Incorporated in the carcass 38 are plies 40 and 42, each comprising a plurality of parallel strip elements 10 which extend to and around the beads 32 from bead to bead.

The strip elements 12 of plies 40 and 42 make, in radial ply tires, a right angle or substantially a right angle with each bead 32. Other angular relationship with the bead, as the tire designer may elect, are contemplated within the scope of this invention.

Disposed outwardly from the plies 40 and 42, belt plies 44 and 46 extend circumferentially fully around the tire, each ply including a plurality of the strip elements 10, oriented at selected acute angles with respect to the midcircumferential plane of the tire.

The strip elements 12 of belt plies 44 and 46 are shown disposed at relatively small and opposite angles with respect to the medial plane, i.e., midcircumferential or equatorial plane, of the tire (perpendicular to a tire axis of rotation). The invention also contemplates the use of fabric ply comprising the strip elements or strip elements alone at greater or lesser angles.

Belt plies 44 and 46 extend laterally generally across the entire width of the tread, the specific extent being at the discretion of the tire designer, as are the specific number and orientation of the plies used.

This invention is of particular use in the construction of pneumatic tires, but it will be apparent to those skilled in the art that the strip element and the fabric ply according to the invention will be useful also in other reinforced rubber articles which employ one or more plies of fabric to resist tensile stresses due to inflation or other applied forces.

The embodiments shown and described are of the best mode presently known of making and using the invention.

Numerous alterations and modifications will now be apparent to those skilled in the art and the invention is not limited to the embodiments shown herein as exemplary but only as defined in the claims.

What we claim is:

1. A pneumatic tire comprising a carcass having at least one reinforcement ply of fabric, said fabric including a plurality of strip elements of non-circular cross-section having width in the plane of said ply significantly greater than thickness normal to said ply, and each of said elements comprising a multiplicity of filaments of length generally equal to the length of the element adhesively compacted together in substantially untwisted parallel array.

2. A rubber article having at least one ply of reinforcement fabric, said fabric comprising a plurality of strip elements of non-circular cross-section, each of said elements comprising in a single bundle a multiplicity of filaments of running length generally equal to the length of the respective element adhesively joined together in substantially untwisted parallel array.

3. A strip element of non-circular cross-section for the reinforcement of a rubber article comprising in a single bundle a multiplicity of filaments of length generally equal to the length of the element adhesively joined together in substantially untwisted parallel array.

4. A strip element according to claim 3 wherein the said cross-section is substantially rectangular and the periphery of said cross-section is significantly greater than the circumference of a circle having an area equal to the area of said cross-section.

5. A strip element according to claim 3 wherein the ratio of width to thickness of the said cross-section is greater than 5 and less than 25.

6. A strip element in accordance with claim 3 wherein the adhesive/filament ratio is greater than 9 percent.

7. A strip element in accordance with claim 3 wherein the said filaments are polyester.

8. A strip element according to claim 3 wherein said filaments are glass fiber filaments.

9. A fabric for use in the reinforcement of pneumatic tires comprising a plurality of parallel strip elements, each element being of non-circular cross-section and each comprising in a single bundle a multiplicity of filaments of length generally equal to the length of the element adhesively joined together in substantially untwisted parallel array.

10. A fabric according to claim 9 comprising in addition means joining said plurality of strip elements to allow limited relative movement therebetween.

11. A fabric ply including fabric according to claim 10 wherein said joining means is rubber and in which the rubber/filament ratio by weight is less than 30 percent.

12. A pneumatic tire having a carcass and at least one ply disposed outwardly of the carcass, said ply including a fabric of reinforcement members, each member consisting of a single bundle of filaments of length generally equal to the length of said member and adhesively joined together in substantially untwisted parallel array, and each bundle having a non-circular cross-section of width in the plane of said ply significantly greater than its thickness normal to said ply.

13. In a pneumatic tire of the radial ply type having a carcass, sidewalls, beads and a tread portion, said carcass having at least one reinforcing ply comprising radially oriented coherent reinforcing strip elements and at least one additional ply comprising coherent strip elements oriented at an acute angle with respect to the midcircumferential plane of said tire, said additional ply being disposed outwardly of said carcass, each said strip element comprising a multiplicity of filaments of length generally equal to the length of the element adhesively joined together in substantially untwisted parallel array of generally rectangular cross-section, the ratio of width to thickness of said cross-section being greater than 5 and less than 25, the adhesive/filament ratio being greater than 9 percent.

References Cited

UNITED STATES PATENTS

| | | | |
|---|---|---|---|
| 2,982,328 | 5/1961 | Emanueli et al. | 152—361 |
| 3,095,026 | 6/1963 | Weber | 152—361 XR |
| 3,133,583 | 5/1964 | Dobson | 152—361 XR |

FOREIGN PATENTS

| | | |
|---|---|---|
| 1,347,506 | 11/1963 | France. |
| 1,376,590 | 9/1964 | France. |
| 1,012,838 | 7/1957 | Germany. |
| 720,149 | 12/1954 | Great Britain. |

ARTHUR L. LA POINT, *Primary Examiner.*

C. B. LYON, *Assistant Examiner.*